United States Patent [19]

Andrejco et al.

[11] 4,450,333
[45] May 22, 1984

[54] ZIRCONIA INDUCTION FURNACE

[75] Inventors: Matthew J. Andrejco, North Hanover Township, Burlington County; Un C. Paek, West Windsor Township, Mercer County; Charles M. Schroeder, Jr., North Hanover Township, Burlington County, all of N.J.

[73] Assignee: AT&T Technologies, Inc., New York, N.Y.

[21] Appl. No.: 383,386

[22] Filed: May 28, 1982

[51] Int. Cl.³ .................. H05B 6/30; C03B 27/02; F27B 14/10
[52] U.S. Cl. .................. 219/10.49 R; 219/10.41; 65/13; 65/374.13; 373/139; 373/155; 156/DIG. 83; 422/248; 432/248; 432/264; 427/45.1
[58] Field of Search .................. 219/10.49 R, 10.41, 219/10.43; 373/138, 139, 155; 422/246, 248, 249; 432/264, 265, 248, 156; 65/2, 13, 3.11, 374.13; 156/608, 617 SP, 617 V, DIG. 83, DIG. 96, DIG. 112; 427/45.1, 46, 49, 50, 51

[56] References Cited
U.S. PATENT DOCUMENTS

| 3,362,803 | 1/1968 | Dannohl et al. | 65/2 |
| 3,401,227 | 9/1968 | Dunlevy et al. | 373/155 |
| 3,404,973 | 10/1968 | Nedelec | 65/374.13 |
| 3,916,047 | 10/1975 | Niesen | 373/155 X |
| 4,029,466 | 6/1977 | Ishii et al. | 432/264 |
| 4,052,153 | 10/1977 | Borer et al. | 432/156 |
| 4,090,851 | 5/1978 | Berkman et al. | 156/DIG. 83 |
| 4,107,450 | 8/1978 | Costin | 373/155 |
| 4,159,891 | 7/1979 | Schmidt et al. | 432/264 |
| 4,356,152 | 10/1982 | Berkman et al. | 422/246 X |

FOREIGN PATENT DOCUMENTS 2013820 4/1970 France.
41-12883 7/1966 Japan.

OTHER PUBLICATIONS

"A Zirconia Induction Furnace for Drawing Precision Silica Wave Guides", by R. B. Runk, *Optical Fiber Transmission II* Technical Digest (Tu B5-1), Feb. 1977.

*Primary Examiner*—Roy N. Envall, Jr.
*Assistant Examiner*—Philip H. Leung
*Attorney, Agent, or Firm*—D. J. Kirk

[57] ABSTRACT

A high frequency induction furnace (10) for reflowing a portion of a lightguide preform (44) in order to draw a fiber (52) therefrom. The furnace (10) has a centrally located tubular susceptor (34) therein having a thin coating of the preform material (e.g., silica) on at least a portion of the inside surface thereof. A cylinder (62) is positioned in concentric, spaced relation about the susceptor (34) and is surrounded by an insulating grain (36). A high frequency coil (38) is energized to couple its electromagnetic field to the susceptor (34) to heat and reflow a portion of the preform (44) in order to draw the fiber (52) therefrom. The thin coating prevents contaminating particulates from migrating from small cracks in the inside surface of the susceptor (34) onto the preform (44) while the cylinder (62) prevents small particulate emanating from the insulating grain (36) from being drawn through larger cracks in the susceptor and onto the preform and/or the fiber 52.

6 Claims, 4 Drawing Figures

ZIRCONIA INDUCTION FURNACE

TECHNICAL FIELD

The invention is directed to a furnace for heating a lightguide preform to an elevated temperature in order to draw a fiber therefrom.

BACKGROUND OF THE INVENTION

The development of low loss, fused silica lightguide fiber over the last few years has led to the investigation of high temperature (e.g., approximately 2000° C.) heat sources, for the drawing of high strength fiber from a lightguide preform. Of the possible heat sources, the oxy-hydrogen torch, the $CO_2$ laser and a few induction and resistance furnaces have been employed for drawing the high silica fibers. The torch method, while inexpensive, cannot maintain a uniform diameter over long lengths of fiber. The $CO_2$ laser provides the cleanest drawing atmosphere, but requires special optical designs to radially distribute the energy for drawing and is limited in power, while resistance furnaces require an inert, protective, atmosphere to prevent oxidation of the heating element.

An induction furnace is basically comprised of a hollow, centrally located, tubular susceptor surrounded by insulating material. An induction coil is mounted about the insulating material to provide an alternating electromagnetic field when energized. The field couples to the susceptor, elevating the temperature thereof, forming a hot zone therein. A glass lightguide preform is then introduced into the hot zone to reflow a portion thereof from which a lightguide fiber is drawn.

High temperature induction furnaces provide high thermal inertia, high stability, and radially symmetric heating. Most induction furnaces, however, use graphite or refractory metallic susceptors which require the flowing of protective atmospheres during operation to remove contaminants migrating from the inside surface of the susceptor. As a result such furnaces have limited susceptor life and have some degree of contamination in the furnace atmosphere.

One induction furnace designed to overcome the foregoing problems is described in an article entitled "A Zirconia Induction Furnace For Drawing Precision Silica Waveguides" by R. B. Runk in the Optical Fiber Transmission II technical digest (Tu B5-1), Feb. 22-24, 1977 which is incorporated by reference herein. That furnace uses a cylindrical susceptor tube made of yttria stabilized zirconium dioxide. The susceptor has a long life expectancy and has minimal furnace atmosphere contamination in an oxygen-bearing atmosphere. Such a furnace has been shown to be most effective in drawing lightguide fiber from a preform. However, it has been found that after extended use microscopic particles of zirconium dioxide migrate from the susceptor onto the preform and/or the fiber being drawn from the lightguide preform. The zirconium dioxide particles substantially weaken the drawn fiber resulting in unacceptable product.

One technique used to substantially eliminate the migration of the zirconium dioxide particles from the susceptor tube is described in copending U.S. patent application Ser. No. 383,066 to U. C. Paek and C. M. Schroeder Case 14-4 entitled "Modified Zirconia Induction Furnace" which was filed on even date herewith. That application is assigned to the instant assignee and is incorporated by reference herein. The Paek-Schroeder application describes the deposition and consolidation on the inside surface of the susceptor of a porous "soot" of the same material (e.g., silica) as that of the lightguide preform to be heated therein. The porous soot may be consolidated as the temperature of the furnace is raised to the drawing temperature of approximately 2000° C. Such a technique has been most successful under normal running conditions which tend to cause cracks in the susceptor on the order of about 0.015 inch in width or less. However, when the cracks are greater than that thickness the migration of particulate zirconium dioxide resumes. This appears to be due to such cracks being too large to be filled with the consolidated soot, which permits microscopic particles from the insulating zirconium dioxide grain, which surround the susceptor, to be drawn therethrough and deposit on the preform and/or the drawn fiber.

Accordingly, there is a need for a technique for substantially eliminating contaminating particulates from migrating through the relatively large cracks in the furnace susceptor.

SUMMARY OF THE INVENTION

The instant invention overcomes the foregoing problem with an induction furnace for heating a lightguide preform in order to draw a fiber therefrom, the furnace having a centrally located tubular susceptor surrounded by an insulating grain and an induction coil. A thin coating of the lightguide preform material is located on at least a portion of the inside surface of the susceptor and a cylinder is positioned about and spaced from the susceptor, interposed between the insulating grain and the susceptor.

IN THE DRAWINGS

DETAILED DESCRIPTION

Figure 1:
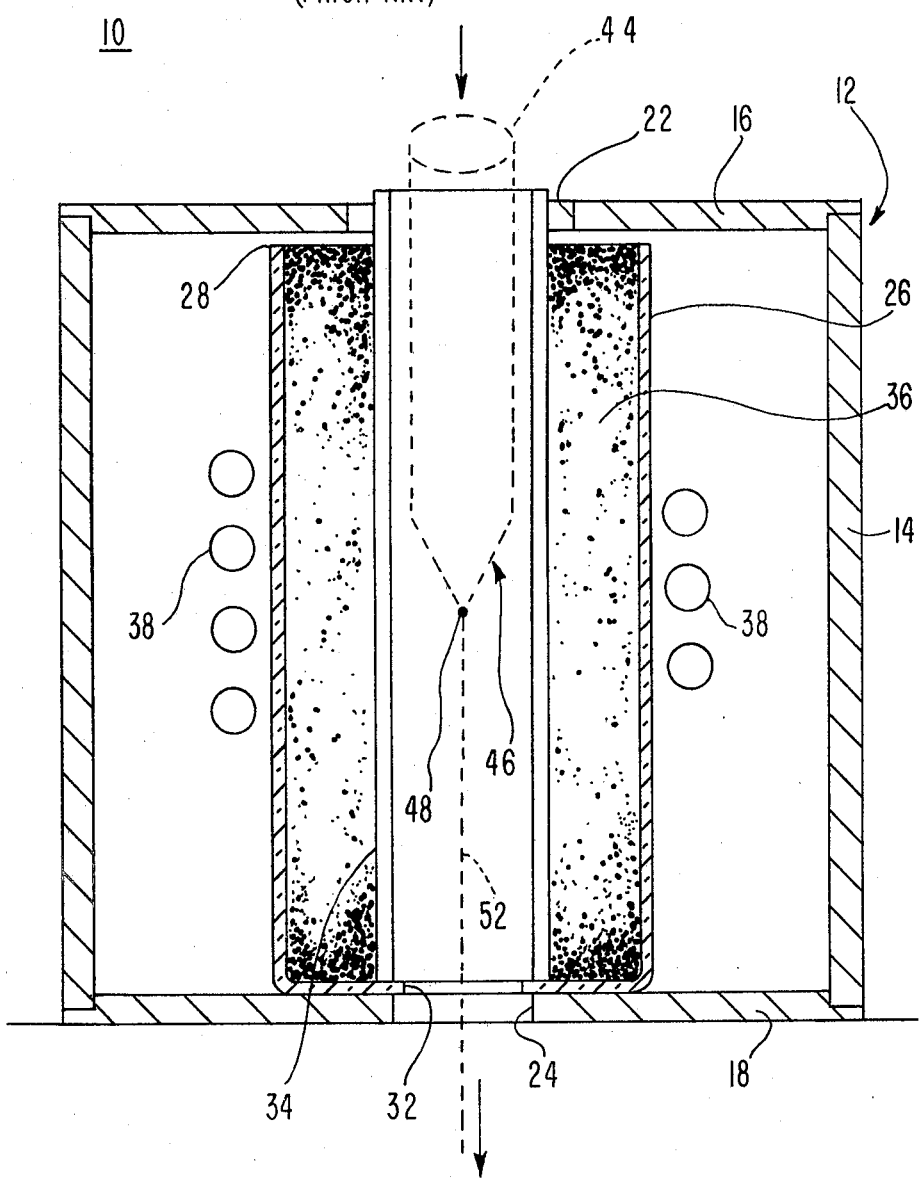
FIG. 1 is a cross-sectional view of a prior art induction heating furnace.

FIG. 1 depicts a prior art high temperature induction furnace generally referred to by the numeral 10. The furnace 10 is comprised of a cylindrical housing 12 having a side wall 14, a top portion 16 and a bottom portion 18. The top portion 16 has a central opening 22 therein which is vertically aligned with an opening 24 in the bottom portion 18. A silica beaker 26, open at the top 28 has a circular aperture 32 in the bottom surface thereof which is axially aligned with the openings 22 and 24. A tubular susceptor 34 is centrally located within the beaker 26. The annular volume between the inside surface of the beaker 26 and the outside surface of the susceptor 34 is filled with a zirconium dioxide insulating grain 36. An RF induction coil 38, of circular or rectangular cross section, connected to a power source (not shown) is mounted about the beaker 26. The housing 12 may be fabricated of copper which is water cooled, or the like, which acts as a shield to reduce stray radio-frequency fields. The susceptor 34 is 8 weight percent yttria stabilized zirconium dioxide, composition 1372 of Zircoa Company, Solon, Ohio.

The low temperature resistivity of the zirconium dioxide susceptor 34 ($> 10^4$ ohm-cm at room temperature) is too high to directly couple to the alternating electromagnetic field of the activated RF coil 38. For this reason, the zirconium dioxide susceptor 34 is preheated by coupling to a carbon rod (not shown), axially inserted therein, at room temperature. Above 1000° C. the zirconium dioxide susceptor 34 begins to couple to the electromagnetic field, and by approximately 1400° C. the carbon rod can be withdrawn without thermally shocking the susceptor.

By this method the temperature of the furnace 10 is raised to the operating temperature in approximately 60 minutes. During operation, the temperature of the zirconium dioxide susceptor 34 is monitored and controlled with an infrared pyrometer (not shown) to within ±2° C. of the desired set point. Fiber drawing temperatures normally used are between 1900° C. and 2300° C. depending upon the size of the preform 44 and the fiber drawing velocity. During operation at these temperatures typically 7 kilowatts of power are required for maintaining a steady state operation. Frequencies on the order of about 4 megahertz are required for efficient operation at those temperatures. The RF field does not couple to the high resistivity grain 36 which is large particle sized and coarse grained. Thus, the grain 36 acts as an insulator to maintain an elevated temperature within the susceptor 34 during operation. The grain 36 is electrically fused zirconium dioxide (−8 to 14 mesh) manufactured by TAM Ceramics, Niagara Falls, N.Y.

Once the temperature within the susceptor 34 has reached the desired level (e.g., 2000° C.), a solid, substantially cylindrical, silica, lightguide preform 44 (shown in phantom) is axially inserted therein until a first end 46 thereof is positioned at a "hot zone" which is located centrally in the susceptor within the RF coil 38. The elevated temperature heats the preform 44 to reflow a small volume 48 at the end thereof from which a lightguide fiber 52 is drawn.

Although such a technique has been most effective, after a period of time it has been found that very small particles of zirconium dioxide have deposited on the preform 44 and/or the fiber 52. Such particles are then drawn into and contaminate the lightguide fiber 52. Such contamination results in low strength fiber and substantially decreases fiber production yields. It is widely believed that the small zirconium dioxide particles emanate from small microcracks formed in the susceptor 34 at elevated temperatures.

One technique used to overcome the foregoing problem is described in the aforementioned copending U.S. patent application wherein a layer of soot of the same material (e.g., silica) as that of the preform 44 is deposited on at least a portion of the inside surface of the tubular susceptor 34 using well known soot deposition techniques. The susceptor 34 is then placed inside the furnace 10 and the coil 38 activated to form a centralized hot zone having an elevated temperature about 2000° C. which reflows a portion of the preform 44 while consolidating the previously deposited soot. The fiber 52 is then drawn from the preform as previously described. The drawn fiber 52 has been found to be less contaminated resulting in substantially higher strength and a greater production yield.

Although the mechanism is not fully understood it is believed that a portion of the consolidated soot coating diffuses into any microcracks in the susceptor 34 to (1) form a seal and (2) act as a bond. Additionally, a very thin layer of the consolidated soot remains on the surface of the susceptor 34 which substantially precludes particles from leaving that surface and undesirably attaching to the preform 44. Advantageously, any of the deposited, consolidated soot which leaves the surface of the susceptor 34 will not affect the drawn fiber 52 in as much as both the preform 44 and the consolidated soot are the same material.

Figure 2:
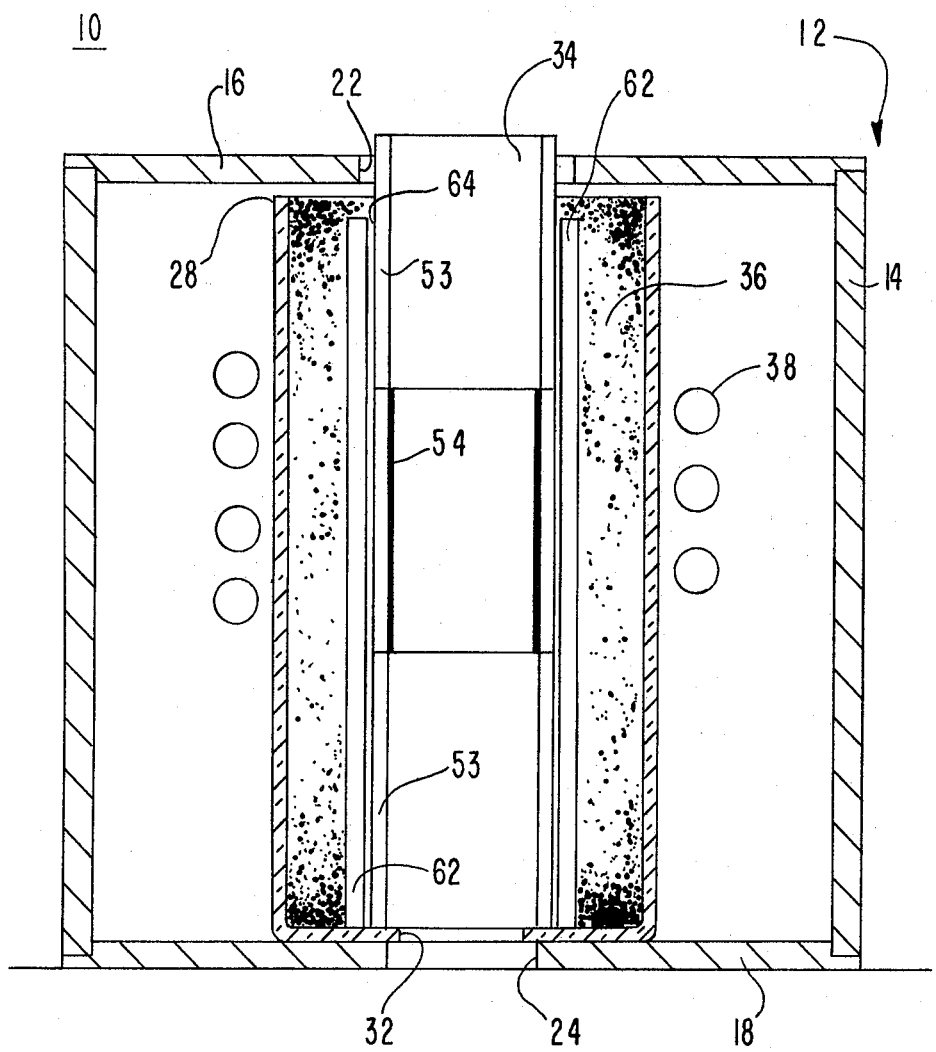
FIGS. 2 to 4 are cross-sectional views of various embodiments of the instant induction heating furnace.

As hereinbefore indicated, the aforementioned technique works well when the cracks are relatively small (e.g., 0.015 inch in width), but larger cracks cannot be sealed using such a technique. It appears that microscopic zirconium dioxide particles from the grain 36 are drawn through the larger cracks by gas flows caused by a chimney effect within the susceptor 34. Accordingly, a further modification (see FIG. 2) has been implemented to substantially eliminate very small particles of zirconium dioxide from migrating from the grain 36 through such large cracks and depositing on the preform 44 and/or the fiber 52. FIG. 2 depicts a furnace 10 having a susceptor 34 comprised of three stacked zirconium dioxide tubes 53—53 in which a silica soot 54 has been deposited on the inside surface of only the middle tube. Additionally, a zirconium dioxide cylinder 62 is positioned about and in spaced relation to the susceptor tubes 53—53 leaving a space 64 therebetween. The cylinder 62 is sufficiently less dense (e.g., 20 to 30% porosity) than the high density susceptor tubes 53—53 so as not to be inductively coupled to the electromagnetic field of the energized coil 38. The cylinder 62 is comprised of calcium stabilized zirconium dioxide coarse grain composition #1247 manufactured by Zircoa Company, Solon, Ohio.

As the furnace 10 is brought up to temperature, the silica soot 54 consolidates on the inside of the middle susceptor tube 53 as hereinbefore described to prevent particulate zirconium dioxide from migrating onto the lightguide preform 44. Furthermore, the cylinder 62 acts as a barrier to any microscopic particulate from the grain 36 that might be otherwise drawn through larger, unsealed cracks in the susceptor tubes 53—53.

Figure 3:
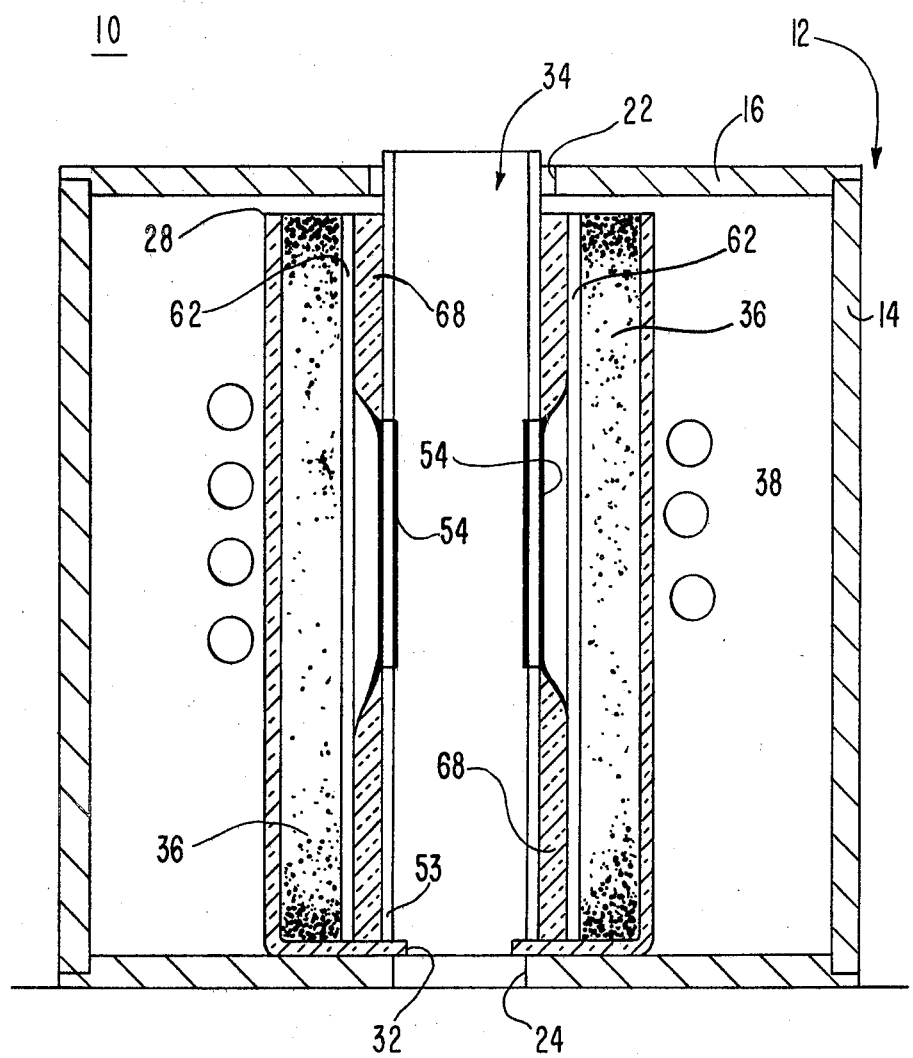

In a further embodiment shown in FIG. 3, the middle tube 53 was coated with a porous silica soot 68 on the outside surface in addition to the soot 54 on the inside surface thereof. The soot 68 is also deposited on the outside surface only of the top and bottom tubes 53—53. The distance between the outer surface of the susceptor tubes 34—34 and the inner surface of the cylinder 62 is not to scale and is exaggerated for purposes of clarity of exposition. The coils 38 are energized to bring the furnace 10 up to temperature and the silica soot 54 and 68 consolidates on both sides of the middle susceptor tube 53. As can be seen in FIG. 3 the glass soot 68 on the outside surface of the top and bottom tubes 53—53 remains unconsolidated and tends to maintain a concentric alignment between the susceptor tubes 53—53 and the cylinder 62.

Figure 4:
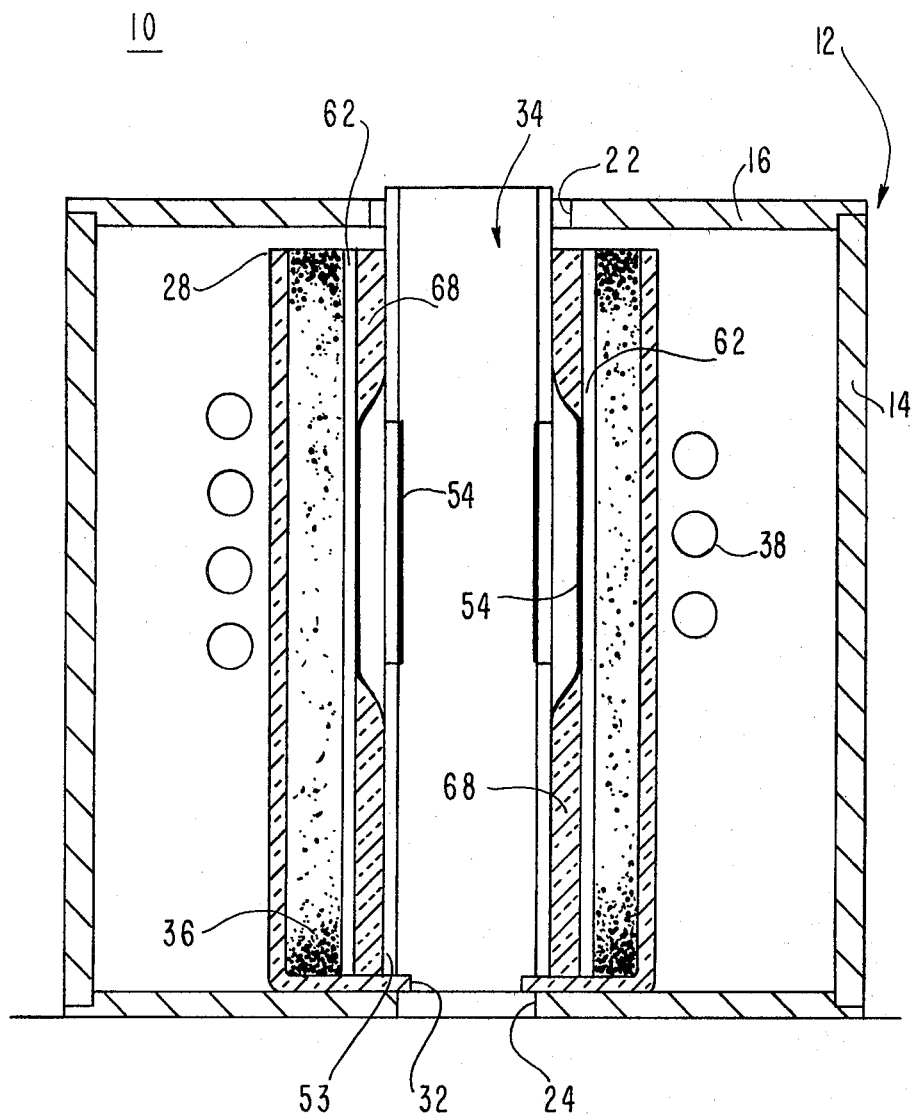

In yet a further embodiment of the instant invention shown in FIG. 4 the silica soot 68 was deposited on the inside surface of the cylinder 62 and snugly slipped about the susceptor tubes 53—53. The middle tube 53 was coated with silica soot 54 on the inside surface thereof. Upon activation of the coils 38 the soot 54 is consolidated and a portion of the silica soot 68 consolidated on the central, inside surface of the cylinder 62 while the rest of the soot remains porous or unconsolidated to maintain the spaced, concentric alignment between the susceptor tubes 53—53 and the cylinder 62.

It is to be understood that the embodiments described herein are merely illustrative of the principles of the invention. Various modifications may be made thereto by persons skilled in the art without departing from the spirit and scope of the invention.

What is claimed is:

1. In an induction furnace for heating a lightguide preform and drawing a fiber therefrom, the furnace having a centrally located tubular susceptor surrounded by an insulating grain and an induction coil, comprising:
   a thin coating of the lightguide preform material on at least a portion of the inside surface of the susceptor; and
   an insulating cylinder positioned about and spaced from the susceptor, interposed between the insulating grain and the susceptor wherein said cylinder substantially eliminates the migration of small particles of the grain to the preform and/or the fiber.

2. The furnace as set forth in claim 1, wherein:
   the thin coating material is silica; and
   the susceptor is zirconium dioxide.

3. The furnace as set forth in claim 1, wherein:
   a silica soot is located between the cylinder and the susceptor.

4. The furnace as set forth in claim 3, wherein:
   a portion of the silica soot is consolidated on the outside surface of the susceptor.

5. The furnace as set forth in claim 3, wherein:
   a portion of the silica soot is consolidated on the inside surface of the cylinder.

6. A method of drawing a fiber from a lightguide preform, the method comprising the steps of:
   axially introducing the preform into a tubular susceptor within an induction furnace, said susceptor being surrounded by an insulating grain, said susceptor being further surrounded by and spaced from an insulating cylinder interposed between the grain and the susceptor, the susceptor having a coating of the preform material on at least a portion of the inside surface thereof; wherein said cylinder substantially eliminates the migration of small articles of the grain to the preform and/or the fiber;
   activating high frequency induction coils to couple electromagnetic energy to the susceptor to elevate the temperature thereof to reflow a portion of the lightguide preform therein; and
   drawing a fiber from the reflown portion of the preform.

* * * * *